(12) United States Patent
Shivanna et al.

(10) Patent No.: US 12,131,152 B2
(45) Date of Patent: Oct. 29, 2024

(54) APPLICATION PORTABILITY METRIC MEASUREMENT

(71) Applicant: Cisco Technology, Inc., San Jose, CA (US)

(72) Inventors: Madhusudan Aremallenahally Shivanna, Bangalore (IN); Sahil Ashish Ranadive, Nashik (IN); Akshit Grover, Haryana (IN); Sumit Kumar Saha, Gujarat (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/743,807

(22) Filed: May 13, 2022

(65) Prior Publication Data

US 2023/0367590 A1 Nov. 16, 2023

(51) Int. Cl.
*G06F 8/77* (2018.01)
(52) U.S. Cl.
CPC ..................... *G06F 8/77* (2013.01)
(58) Field of Classification Search
None
See application file for complete search history.

(56) References Cited

U.S. PATENT DOCUMENTS

| | | | | |
|---|---|---|---|---|
| 6,138,271 A * | 10/2000 | Keeley | ................ | G06F 9/44521 717/162 |
| 7,774,757 B1 | 8/2010 | Awasthi et al. | | |
| 9,355,016 B2 | 5/2016 | Baril et al. | | |
| 10,372,600 B2 | 8/2019 | Mathur | | |
| 10,623,372 B2 | 4/2020 | Wang et al. | | |
| 10,831,475 B2 | 11/2020 | Hicks et al. | | |
| 11,507,353 B1 * | 11/2022 | Soeters | ................ | G06F 8/60 |
| 11,531,526 B1 * | 12/2022 | Dunham | ................ | G06F 8/76 |
| 2003/0097651 A1 * | 5/2003 | Markstein | ................ | G06F 8/4434 717/152 |
| 2004/0194055 A1 * | 9/2004 | Galloway | ................ | G06F 8/76 717/101 |
| 2007/0234285 A1 | 10/2007 | Mendoza et al. | | |

(Continued)

OTHER PUBLICATIONS

L. Thomeczek, A. Attenberger, J. Kolb, V. Matousek and J. Mottok, "Measuring Safety Critical Latency Sources using Linux Kernel eBPF Tracing," ARCS Workshop 2019; 32nd International Conference on Architecture of Computing Systems, Copenhagen, Denmark, 2019, pp. 1-8. (Year: 2019).*

(Continued)

*Primary Examiner* — Andrew M. Lyons
(74) *Attorney, Agent, or Firm* — BEHMKE INNOVATION GROUP LLC; James M. Behmke; James J. Wong (57) ABSTRACT

In one embodiment, a test process herein may: execute an application under test; monitor execution of the application under test for system calls specific to a particular operating system in which the application under test is being executed; capture a count of system calls specific to the particular operating system during the execution of the application under test; and compute a portability metric based on the count of system calls specific to the particular operating system, the portability metric indicative of how dependent the application under test is on the particular operating system.

17 Claims, 6 Drawing Sheets

(56) References Cited

U.S. PATENT DOCUMENTS

| | | | | |
|---|---|---|---|---|
| 2010/0257253 A1* | 10/2010 | Saha | ................... | G06F 21/52 |
| | | | | 709/217 |
| 2014/0372630 A1* | 12/2014 | Bostick | ............... | G06F 11/3089 |
| | | | | 710/5 |
| 2015/0040216 A1* | 2/2015 | Moore | .................. | G06F 21/566 |
| | | | | 726/22 |
| 2018/0068251 A1* | 3/2018 | Conti | .................. | G06F 11/3672 |
| 2021/0326121 A1* | 10/2021 | Ackroyd | ................. | G06F 8/433 |

OTHER PUBLICATIONS

"EBPF", online: https://ebpf.io/, accessed May 2, 2022, 4 pages, The Linux Foundation.

\* cited by examiner

APPLICATION PORTABILITY METRIC MEASUREMENT

TECHNICAL FIELD

The present disclosure relates generally to computer systems, and, more particularly, to an application portability metric measurement.

BACKGROUND

There has been extensive research on measuring the quality of software. However, currently, there are no automated ways of capturing how coupled an application is to an operating-system. This is a useful quality metric to determine how portable an application is (or inversely, to determine how coupled an application is to the operating-system). How portable an application is an indication of the quality of the design of the application, which is necessary for maintaining and refactoring the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a test process herein may: execute an application under test; monitor execution of the application under test for system calls specific to a particular operating system in which the application under test is being executed; capture a count of system calls specific to the particular operating system during the execution of the application under test; and compute a portability metric based on the count of system calls specific to the particular operating system, the portability metric indicative of how dependent the application under test is on the particular operating system.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
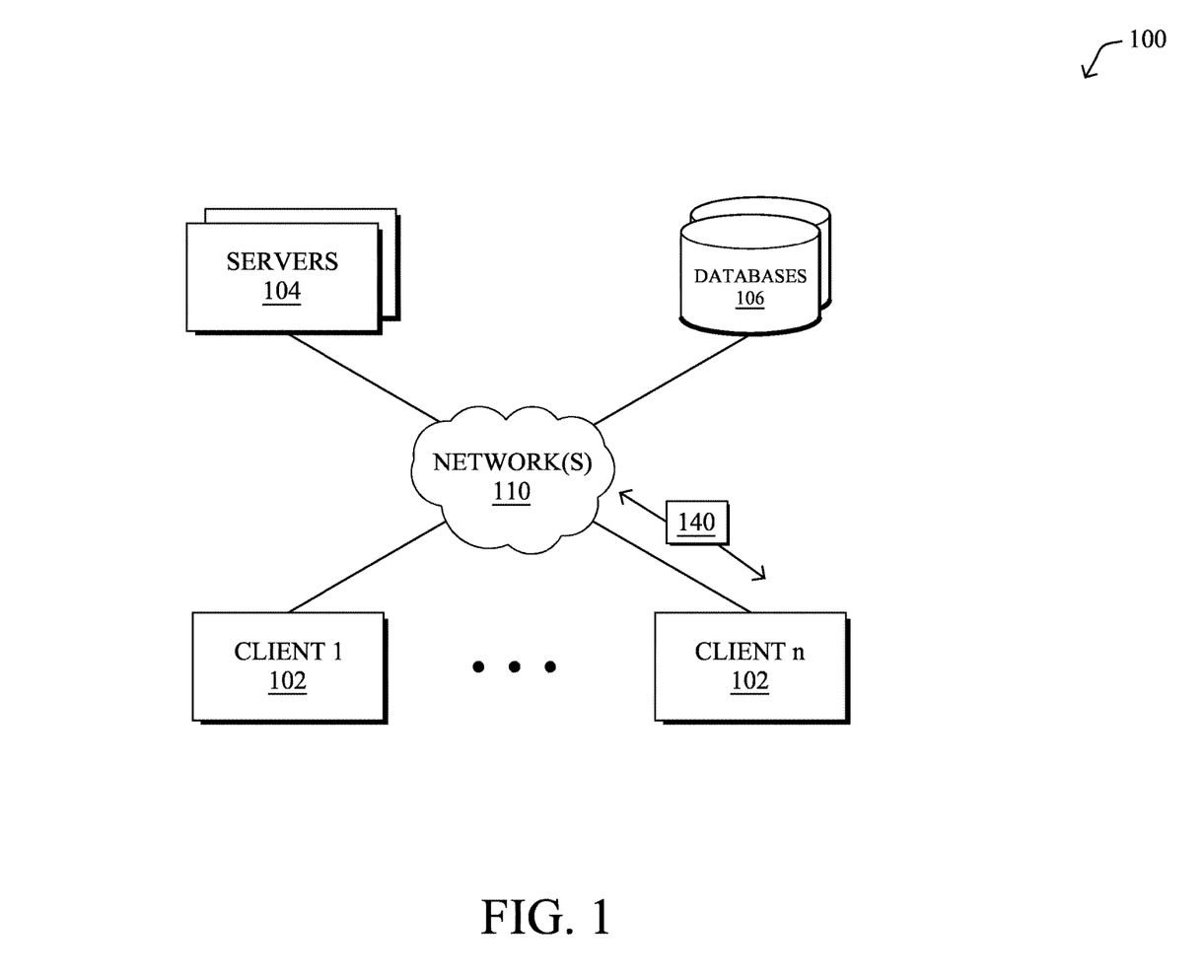
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
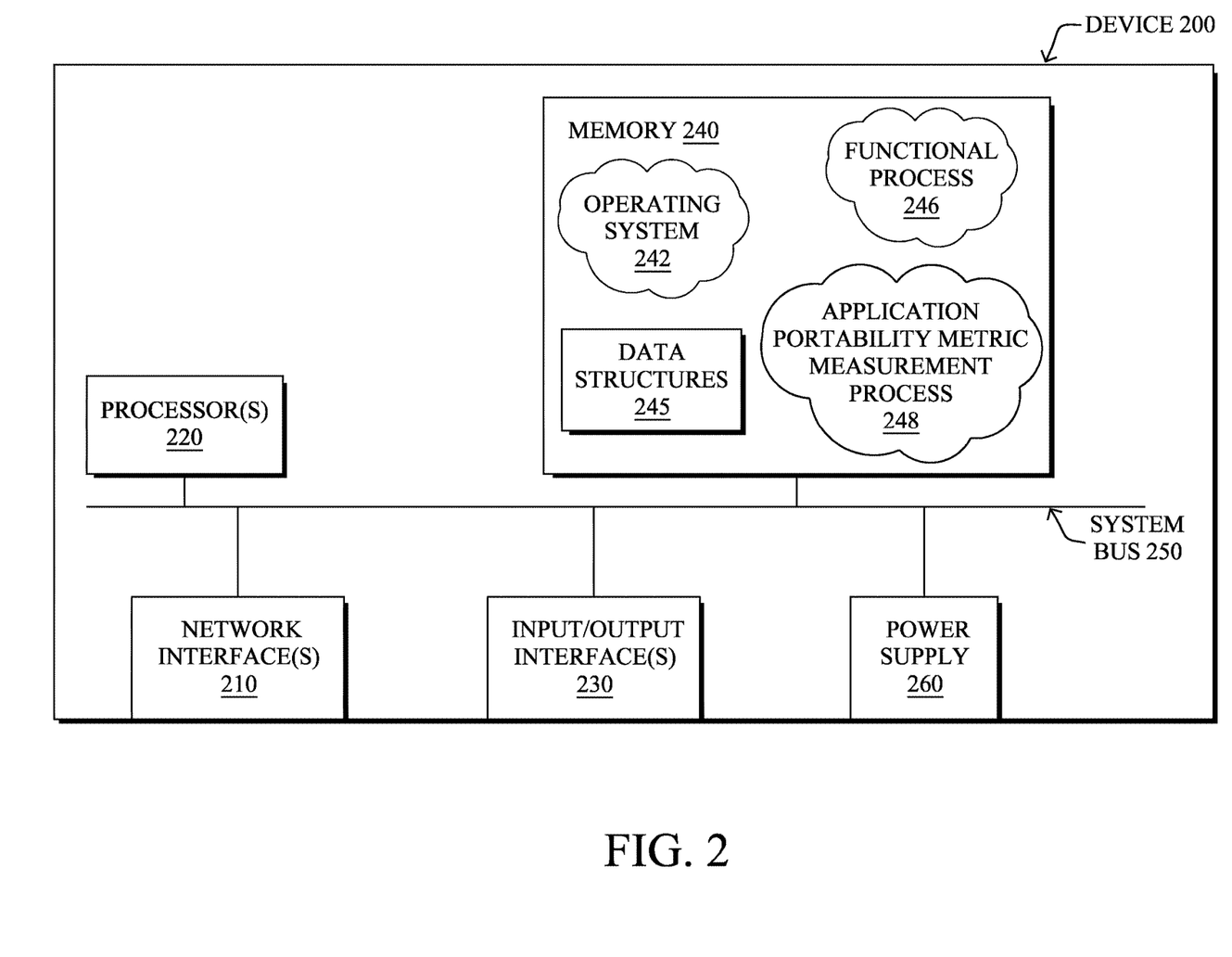
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "application portability metric measurement" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Portability Metric Measurement——

As noted above, there are currently no automated ways of capturing how coupled an application is to an operating-system. This is a useful quality metric to determine how portable an application is (or inversely, to determine how coupled an application is to the operating-system). How portable an application is an indication of the quality of the design of the application, which is necessary for maintaining and refactoring the application.

The techniques herein, therefore, provide an application portability metric measurement. That is, the techniques herein capture metrics related to system-calls made by an application (App) to an operating system (OS) (e.g., using specific system-call capture tools). The metrics may then report this metric to developers in a continuous integration (CI) pipeline to indicate how coupled an App is to an OS. Developers can then use this metric to tune/refactor the code/design of the App, accordingly.

Specifically, according to one or more embodiments described herein, a test process herein may: execute an application under test; monitor execution of the application under test for system calls specific to a particular operating system in which the application under test is being executed; capture a count of system calls specific to the particular operating system during the execution of the application under test; and compute a portability metric based on the count of system calls specific to the particular operating system, the portability metric indicative of how dependent the application under test is on the particular operating system.

In general, there are several quality metrics associated with an application (App), namely: code-coverage percentage, count of code-smells, count of security vulnerabilities, count of linter errors, count of memory leaks, etc. But from the software-design perspective the quality metrics are not easy to measure and sometimes are not quantifiable. How loosely-coupled are the components/modules of an application with each other and to components external to the App is one such design quality metric. How loosely coupled are the modules/components of an application to the operating-system, is a much more specific version of the above mentioned design quality metric. The techniques herein refer to this specific version as a 'Portability Metric' (PM). If an App is more coupled to an OS then it has less portable code and vice-versa. The PM will be able to indicate how portable an application is across different Operating Systems and guide developers in refactoring the modules/components to either reduce the "App-to-OS-interactions" or to segregate the "App-to-OS-interactions" into a separate module of its own, and hence decrease coupling of other modules with the OS. the techniques herein also provide a tool/plugin which can be attached to the CI (Continuous Integration) pipeline flow of an App, which can then calculate the PM for the App and report it to the developer. The developer can then use the reported PM and fine tune the App code/design, if needed, to bring down the coupling of "App to OS", accordingly.

Figure 3:
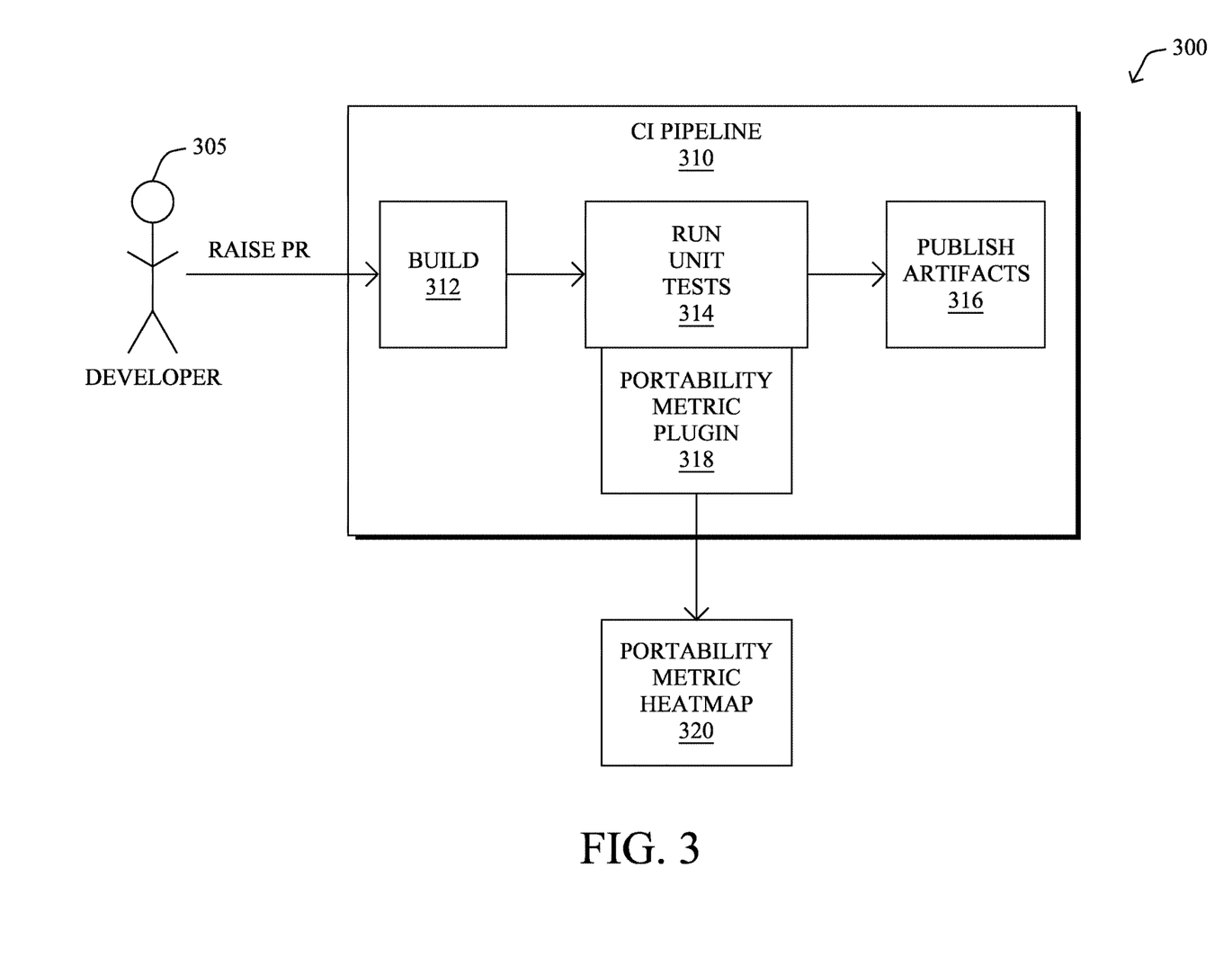
FIG. 3 illustrates an example continuous integration (CI) development pipeline for providing an application portability metric measurement.

Operationally, and with reference to the diagram 300 of FIG. 3, in a CI pipeline 310, a developer 305 may raise a pull request (PR) into the build 312 (e.g., compiler) for an application under test, such that unit-tests 314 may be run for the App under test. In addition to publishing artifacts 316 (as will be understood by those skilled in the art), the techniques herein also attach an illustrative "portability metric plugin" 318 (e.g., an implementation of the "application portability metric measurement" process 248 above) to produce a portability metric as described herein, such as the portability metric heatmap 320, as described below.

In particular, the techniques herein can use a call/interaction technology such as, for example, the enhanced Berkley Packet Filter (eBPF), to intercept the OS-level system-calls/interactions made by the App. Based on these system-calls intercepted, the techniques herein can automatically compute which particular modules of the App (or the frameworks, libraries, directories, files, etc. used by the App) have made how many OS system-calls. The techniques herein may then translate this count into a portability metric (PM), which may further be translated into to a heat-map visualization (e.g., with color coding) to indicate the high/medium/low coupling of modules/files of the App to the operating system, as described in greater detail below. The raw PM or the heat-map can then be used to fine-tune the code or design, if needed.

Figure 4:
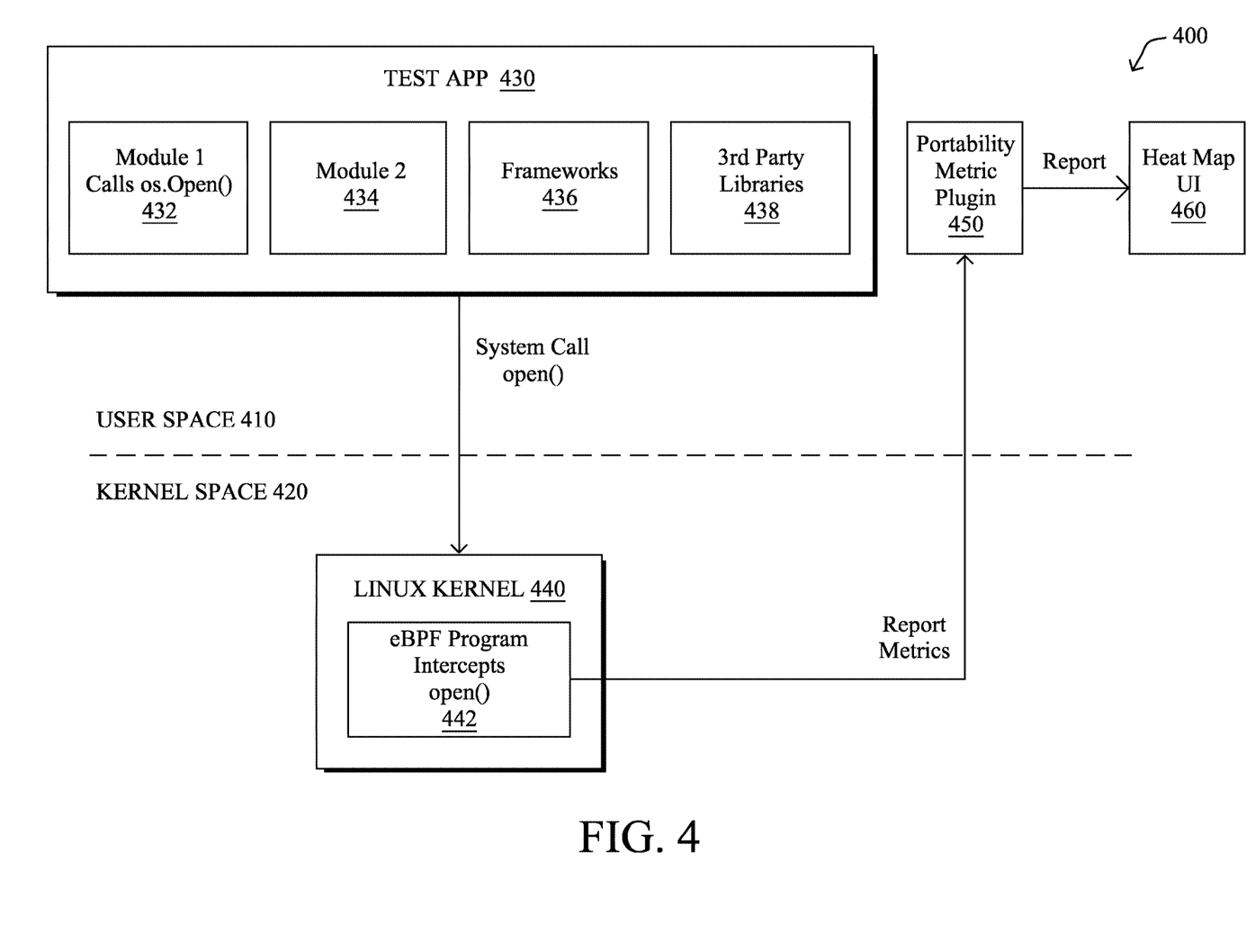
FIG. 4 illustrates an example of monitoring an application under test for computing an application portability metric measurement.

To illustrate the flow, a specific example is now given, particularly with reference to diagram 400 of FIG. 4. Consider a CI pipeline (with user space 410 and kernel space 420), where a "Go" application is developed and unit-tested. (The unit-tests should have 100% coverage to have the PM generated for all the code.) Within the user space 410, the test app 430 is the Go App, which may have module 1 (432), module 2 (434), frameworks 436, third party libraries 438, etc., as will be appreciated by those skilled in the art. System calls from the App may go to the kernel 440 (e.g., Linux kernel), where an intercept program 442 (e.g., eBPF program intercept) captures the OS system calls herein. As part of this CI pipeline, the techniques herein can then integrate reported metrics to the PM metric tool/plugin 450, which can intercept the OS system-calls called from Go App, and generate the portability metric (e.g., sent to heat map UI 460).

Assume, for example, that unit-tests for the above Go App are run in a Linux®-based OS. Consider that there is an example line in the source-code of this Go App as shown below, which tries to open a file "config.yaml" using a Go standard library:
    file, err:=os.Open("config.yaml", os.O_RD).
This Go function under the hood calls Linux system-call:
    open("config.yaml", flags).
Using eBPF, for example, or other technology that can be used to instrument the OS-kernel (e.g., that is supported by Linux®, Windows®, etc.), the techniques herein can intercept the system-call "open( )" (such as through k-probes of eBPF, or other suitable kernel technology for providing dynamic tracing of kernel functions), and record details such as how many times it was called for an App; which file of the App was it called from, what line number was it called from, etc. These metrics (PM) can be used to determine the coupling of the Go App to the OS.

The techniques herein can capture this data for every system call invoked by the App. Assume, for instance, that the Go App has 50 source files and 10 directories (each containing 5 source files). Assume further that each directory is representing a component/module of the App. The techniques herein, therefore, can group/aggregate the metrics collected for each system-call to file or component/module or even to application level. Essentially, the techniques herein can derive a number (portability metric) for each file or module or App which represents the portability of the file/module/App with respect to the OS.

Notably, as background on eBPF, eBPF allows user-space programs/Apps to intercept kernel-space functions/system-calls in a sandboxed environment. A user-space program in a high-level language like Go or Python is written which embeds an 'eBPF program' (written in subset of C language). The Go program calls some eBPF helper functions to inject the 'eBPF program' to Linux kernel. The injected 'eBPF program' can intercept Linux system-calls made from any user-space process and collect information related to that system-call made and also meta-data related to the user-space process. As mentioned above, one of the mechanisms to intercept Linux system-calls using eBPF is called "k-probes". These k-probes (kernel-probes) may be used to register an 'eBPF program' against a system-call so that it gets called when that system call is hit during execution. The information captured by the 'eBPF program' can be transferred to the user-space Go program through a shared memory between user-space and kernel-space called 'eBPF map'.

According to one or more embodiments herein, once the portability metrics are determined, the techniques herein can then generate a heat-map from the portability metric captured by the tool for easy user consumption (e.g., a user interface, UI). That is, and with reference to the heat map 500 of FIG. 5, the techniques herein can represent each file as a shape/icon (e.g., rectangle) and label the rectangle with the file/module name and the portability metric number (e.g., the counted number, a percentage value, a ratio (e.g., "X out of Y"), etc.) generated for the file/module.

Figure 5:
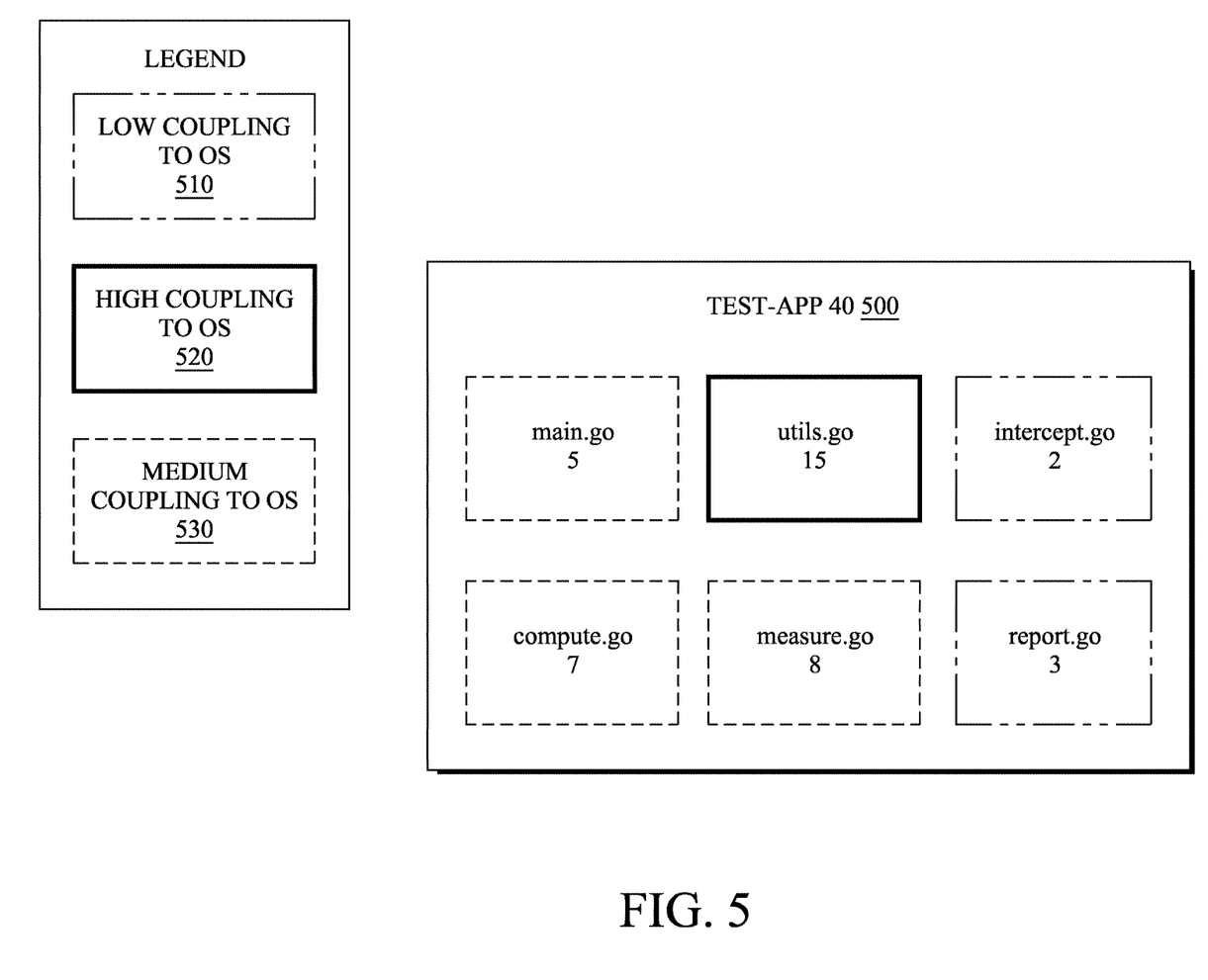
FIG. 5 illustrates an example of a heatmap visualization interface based on an application portability metric measurement.

Based on various thresholds, a color or other visual indicator can be assigned to each rectangle representing a file, to indicate how portable/coupled each file is to the OS. For example, Low coupling to the OS may be represented by a first indicator 510 (e.g., green), and High coupling may be represented by a second indicator 520 (e.g., red). In one embodiment, a third indicator 530 may represent a medium coupling (e.g., yellow). The thresholds between each of the coupling levels may be statically configured, learned over time (e.g., based on similar apps, industry standards, etc.), division points between the minimum and maximum of the PM numbers computed for all the files (e.g., top third, middle third, bottom third), and so on. Other examples may include, for instance, calculating the percentage of systems-calls per file with respect to total-system calls across the application. Users could then configure the ranges (e.g., >70% is high, 20-70% is medium, and <20% is low) with command-line/file-based configuration. Otherwise, the tool can be set to have default thresholds.

Note that as shown, the heap-map can be generated where each internal rectangle will represent a module/directory and its PM number (e.g., "main.go 5", "utils.go 15", "intercept.go 2", etc.) and another number (e.g., "Test-App 40") will represent the sum of the PM numbers of all the files in the App. Similarly, a heat-map may be generated where a single rectangle representing the whole App can be generated with the PM number representing the sum of the PM numbers of all the modules/directories in the App (e.g., simply stating "Test-App 40").

According to the embodiments herein, therefore, the portability information may be communicated in the form of an heat-map image file generated in CI pipeline during unit-test stage, such that developers can take a look at the heat-map and look into the files which have a higher-percentage of system-calls compared to other files and see whether they can be eliminated. For instance, the techniques herein may also provide a list of the OS-specific system calls, optionally with metadata for context, and/or may highlight the OS-specific system calls in the code itself. For example, according to certain embodiments herein, in addition to the portability metric, which represents the overall count of system calls made for each source file, additional metrics like name of system-calls, count of calls for each system call, line number from where call is made, more coordinated code highlighting in a UI, etc. can also be captured/presented to provide additional details for the developers.

That is, based on the heat-map, or the raw PM numbers generated in CI flow, the developer can then make improvements to source-code/design. If there are non-zero PM numbers across multiple modules, then it indicates more modules are coupled to the OS. Then the developer can refactor and move all the OS specific code to one single module to achieve encapsulation and cleaner design. For instance, if the system-calls are spread across multiple files then if it makes sense from the design perspective, then the code can be refactored to move the system-call heavy code/files into their own separate module and encapsulate them with a generic interface which is OS agnostic. This way, the rest of the modules are more portable across different OSes.

Notably, the techniques herein can also be used to perform benchmarking, comparing two apps or two versions of the same app. For instance, if there are two distinct Apps, say A and B, which are built to do the same thing, then the portability metric can be generated for Apps A and B separately, and they can be compared to determine which App is more dependent on the OS (on measure of design quality, i.e., portability and/or coupling to OS).

Note also that different types of apps may have a different standard of what constitutes a "good" or "bad" portability score. For instance, this may depend on the nature of the application (e.g., an application which does heavy I/O operations and very low compute operations may have higher number of system-calls count). As such, the portability metric may need expertise about the application to drill-down into modules/files where the counts are high (e.g., >70%) to inspect those lines and determine if any changes could be made. As above, if there are two applications which are performing the same functionality (e.g., two apps to encrypt data), then if number of system-calls is high for "A" compared to "B" then one can say "B" is more portable or "A" is doing more system calls than needed with reference to "B" to achieve the same functionality.

Furthermore, the techniques herein can be used to benchmark between two versions of the same app, e.g., "app A version 1.0", versus "app A version 1.1" or version 2.0, etc.). This metric comparison may be useful to determine whether the app versions are becoming more or less coupled to the OS, accordingly.

Figure 6:
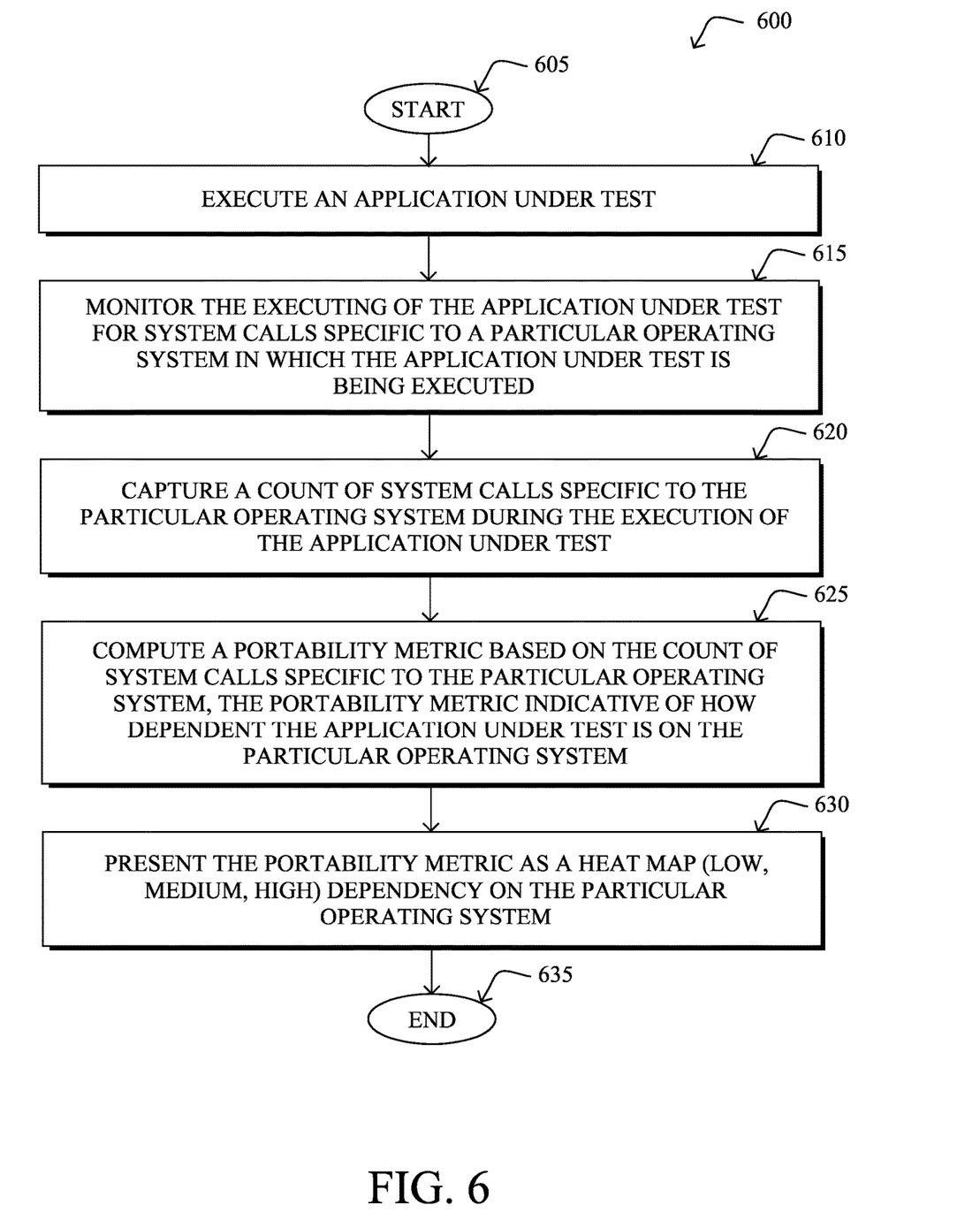
FIG. 6 illustrates an example simplified procedure for providing an application portability metric measurement in accordance with one or more embodiments described herein.

In closing, FIG. 6 illustrates an example simplified procedure for providing an application portability metric measurement in accordance with one or more embodiments described herein, particularly from the perspective of test process/developer CI pipeline tool. For example, a non-generic, specifically configured device (e.g., device 200) may perform procedure 600 by executing stored instructions (e.g., process 248, e.g., a test process). The procedure 600 may start at step 605, and continues to step 610, where, as described in greater detail above, the test process executes an application under test. In step 615, the process monitors execution of the application under test for system calls specific to a particular operating system in which the application under test is being executed. As described above, this may utilize an eBPF to intercept OS-level system-calls made by the application under test.

In step 620, the test process may then capture a count of system calls specific to the particular operating system during the execution of the application under test, and in step 625 computes a portability metric based on the count of system calls specific to the particular operating system, the portability metric indicative of how dependent the application under test is on the particular operating system. Notably, as described above, the process may also specifically divide the portability metric into individual portability metrics for one or more logical divisions within the application under test, such as into metrics specific to modules, frameworks, libraries, directories, files, etc.

Optionally, in step 630, the portability metric(s) may be presented as a heat map of low, medium, and high dependency on the particular operating system, as described in greater detail above. For instance, the heat map may be based on either a total number the count of system calls specific to the particular operating system or a percentage of the count of system calls specific to the particular operating system compared to system calls not specific to the particular operating system. Also, the heat map may be based on configured thresholds for low, medium, and high dependency levels, or other thresholds and/or configurations, accordingly.

The simplified procedure 600 may then end in step 635. Other steps may also be included generally within procedure 600. For example, such steps (or, more generally, such additions to steps already specifically illustrated above), may include: comparing a plurality of portability metrics for a corresponding plurality of applications or versions of a particular application; providing a list of system calls specific to the particular operating system for the application under test (and appending contextual metadata to the list); highlighting system calls specific to the particular operating system in a display of code of the application under test; and so on.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an application portability metric measurement. In particular, the techniques herein help indicate to developers (or auditors, marketers, etc.) how much is an application code tied to a particular OS, where the portability metric plugin determines how many calls are made to the OS, and how many computations are independent in the app. A high metric indicates that the app is more coupled to the OS (possibly indicative of a poor code design). The techniques herein also help the developers to correct and/or segregate their OS-specific calls, for greater application portability.

Currently, there are no tools capturing the metrics to indicate the coupling of "App-to-OS" or to indicate how portable an App is from the perspective of coupling to the OS based on automatically intercepting/capturing the number of OS-specific calls made by the app. Other attempts to capture portability of an app have been made through a number of different approaches, such as, e.g., manual parsing of API functions to determine which functions would break in a new platform, or machine learning to predict a level of portability based on a litany of factors, or even simply a brute force approach to test an application with every combination of operating system, web browser, carrier protocol, and so on to see which combinations break the app. None of the current techniques address computing a portability metric by counting the auto-intercepted OS-system calls, nor providing a heat map that categorizes the calls into their specific modules/files/etc. to assist a developer in making adjustments to their code, accordingly.

Illustratively, the techniques described herein may be performed by hardware, software, and/or firmware, such as in accordance with the illustrative application portability metric measurement process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: executing, by a test process, an application under test; monitoring, by the test process, execution of the application under test for system calls specific to a particular operating system in which the application under test is being executed; capturing, by the test process, a count of system calls specific to the particular operating system during the execution of the application under test; and computing, by the test process, a portability metric based on the count of system calls specific to the particular operating system, the portability metric indicative of how dependent the application under test is on the particular operating system.

In one embodiment, the method further comprises: dividing the portability metric into individual portability metrics for one or more logical divisions within the application is under test selected from a group consisting of: modules; frameworks; libraries; directories; and files.

In one embodiment, the method further comprises: comparing a plurality of portability metrics for a corresponding plurality of applications.

In one embodiment, the method further comprises: comparing a plurality of portability metrics for a corresponding plurality of versions of a particular application.

In one embodiment, the method further comprises: presenting the portability metric as a heat map of low, medium, and high dependency on the particular operating system. In one embodiment, the heat map is based on either a total number the count of system calls specific to the particular operating system or a percentage of the count of system calls specific to the particular operating system compared to system calls not specific to the particular operating system. In one embodiment, the heat map is based on configured thresholds for low, medium, and high dependency levels.

In one embodiment, the method further comprises: providing a list of system calls specific to the particular operating system for the application under test. In one embodiment, the method further comprises: appending contextual metadata to the list.

In one embodiment, the method further comprises: highlighting system calls specific to the particular operating system in a display of code of the application under test.

In one embodiment, monitoring execution of the application under test for system calls specific to the particular operating system in which the application under test is being executed comprises: utilizing an enhanced Berkley Packet Filter (eBPF) to intercept OS-level system-calls made by the application under test.

According to the embodiments herein, an illustrative tangible, non-transitory, computer-readable medium herein may have computer-executable instructions stored thereon that, when executed by a processor on a computer, may cause the computer to perform a method comprising: executing an application under test; monitoring execution of the application under test for system calls specific to a particular operating system in which the application under test is being executed; capturing a count of system calls specific to the particular operating system during the execution of the application under test; and computing a portability metric based on the count of system calls specific to the particular operating system, the portability metric indicative of how dependent the application under test is on the particular operating system.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: execute an application under test; monitor execution of the application under test for system calls specific to a particular operating system in which the application under test is being executed; capture a count of system calls specific to the particular operating system during the execution of the application under test; and compute a portability metric based on the count of system calls specific to the particular operating system, the portability metric indicative of how dependent the application under test is on the particular operating system.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   executing, by a computing device executing a test process, an application under test that is part of a user space and separate from a kernel space;
   monitoring, by the computing device, execution of the application under test for system calls specific to a particular operating system in which the application under test is being executed by utilizing an enhanced Berkley Packet Filter (eBPF) to intercept OS-level system-calls made by the application under test, wherein the eBPF is located in the kernel space and separate from the user space;
   capturing and filtering, by the computing device, system calls specific to the particular operating system during the execution of the application under test to determine a count of calls specific to the particular operating system and to identify one or more logical divisions within the application under test;
   computing, by the computing device, a portability metric based on the count of system calls specific to the particular operating system, the portability metric indicative of how dependent the application under test is on the particular operating system; and
   presenting, by the computing device, the portability metric as a heat map of low, medium, and high dependency on the particular operating system.

2. The method as in claim 1, further comprising:
   dividing the portability metric into individual portability metrics for the one or more logical divisions within the application under test, wherein the one or more logical divisions within the application under test are selected from a group consisting of: modules; frameworks; libraries; directories; and files.

3. The method as in claim 1, further comprising:
   comparing a plurality of portability metrics for a corresponding plurality of applications.

4. The method as in claim 1, further comprising:
   comparing a plurality of portability metrics for a corresponding plurality of versions of a particular application.

5. The method as in claim 1, wherein the heat map is based on either a total number the count of system calls specific to the particular operating system or a percentage of the count of system calls specific to the particular operating system compared to system calls not specific to the particular operating system.

6. The method as in claim 1, wherein the heat map is based on configured thresholds for low, medium, and high dependency levels.

7. The method as in claim 1, further comprising:
   providing a list of system calls specific to the particular operating system for the application under test.

8. The method as in claim 7, further comprising:
   appending contextual metadata to the list of system calls specific to the particular operating system for the application under test.

9. The method as in claim 1, further comprising:
   highlighting system calls specific to the particular operating system in a display of code of the application under test.

10. A tangible, non-transitory, computer-readable medium having computer-executable instructions stored thereon that, when executed by a processor on a computer, cause the computer to perform a method comprising:
    executing an application under test that is part of a user space and separate from a kernel space;
    monitoring execution of the application under test for system calls specific to a particular operating system in which the application under test is being executed utilizing an enhanced Berkley Packet Filter (eBPF) to intercept OS-level system-calls made by the application under test, wherein the eBPF is located in the kernel space and separate from the user space;

capturing and filtering system calls specific to the particular operating system during the execution of the application under test to determine a count of calls specific to the particular operating system and to identify one or more logical divisions within the application under test;

computing a portability metric based on the count of system calls specific to the particular operating system, the portability metric indicative of how dependent the application under test is on the particular operating system; and presenting the portability metric as a heat map of low, medium, and high dependency on the particular operating system.

11. The tangible, non-transitory, computer-readable medium as in claim 10, wherein the method further comprises:

dividing the portability metric into individual portability metrics for the one or more logical divisions within the application under test, wherein the one or more logical divisions within the application under test are selected from a group consisting of: modules; frameworks; libraries; directories; and files.

12. The tangible, non-transitory, computer-readable medium as in claim 10, wherein the method further comprises:

comparing a plurality of portability metrics for a corresponding plurality of applications.

13. The tangible, non-transitory, computer-readable medium as in claim 10, wherein the method further comprises:

comparing a plurality of portability metrics for a corresponding plurality of versions of a particular application.

14. The tangible, non-transitory, computer-readable medium as in claim 10, wherein the method further comprises:

providing a list of system calls specific to the particular operating system for the application under test.

15. The tangible, non-transitory, computer-readable medium as in claim 10, wherein the method further comprises:

highlighting system calls specific to the particular operating system in a display of code of the application under test.

16. An apparatus, comprising:

a processor configured to execute one or more processes; and a memory configured to store a process that is executable by the processor, the process, when executed, configured to:

execute an application under test that is part of a user space and separate from a kernel space;

monitor execution of the application under test for system calls specific to a particular operating system in which the application under test is being executed utilizing an enhanced Berkley Packet Filter (eBPF) to intercept OS-level system-calls made by the application under test, wherein the eBPF is located in the kernel space and separate from the user space;

capture and filter system calls specific to the particular operating system during the execution of the application under test to determine a count of calls specific to the particular operating system and to identify one or more logical divisions within the application under test;

compute a portability metric based on the count of system calls specific to the particular operating system, the portability metric indicative of how dependent the application under test is on the particular operating system; and present the portability metric as a heat map of low, medium, and high dependency on the particular operating system.

17. The apparatus as in claim 16, wherein the processor, when executing the process, is further configured to:

divide the portability metric into individual portability metrics for the one or more logical divisions within the application under test, wherein the one or more logical divisions within the application under test are selected from a group consisting of: modules; frameworks; libraries; directories; and files.

* * * * *

UNITED STATES PATENT AND TRADEMARK OFFICE
CERTIFICATE OF CORRECTION

| | | |
|---|---|---|
| PATENT NO. | : 12,131,152 B2 | Page 1 of 1 |
| APPLICATION NO. | : 17/743807 | |
| DATED | : October 29, 2024 | |
| INVENTOR(S) | : Madhusudan Aremallenahally Shivanna et al. | |

It is certified that error appears in the above-identified patent and that said Letters Patent is hereby corrected as shown below:

In the Specification

Column 9, Line 56 should read:
for one or more logical divisions within the application Signed and Sealed this
Twenty-eighth Day of January, 2025

Coke Morgan Stewart
*Acting Director of the United States Patent and Trademark Office*